United States Patent
Konermann et al.

(10) Patent No.: US 7,369,255 B2
(45) Date of Patent: May 6, 2008

(54) APPARATUS AND METHOD FOR CAPACITIVE MEASUREMENT OF MATERIALS

(75) Inventors: Stefan Konermann, Remscheid (DE); Markus Stein, Gevelsberg (DE)

(73) Assignee: Plast-Control GmbH, Remscheid (DE)

( * ) Notice: Subject to any disclaimer, the term of this patent is extended or adjusted under 35 U.S.C. 154(b) by 186 days.

(21) Appl. No.: 11/328,031

(22) Filed: Jan. 9, 2006

(65) Prior Publication Data

US 2006/0152231 A1 Jul. 13, 2006

(30) Foreign Application Priority Data

Jan. 13, 2005 (EP) ................... 05000561

(51) Int. Cl.
*G01B 9/02* (2006.01)
(52) U.S. Cl. ................ 356/630; 356/632; 324/230
(58) Field of Classification Search ........ 356/630–632, 356/614; 33/831, 813, 820; 324/663, 452, 324/671, 687, 690; 73/159, 37.7, 1.81, 1.7
See application file for complete search history.

(56) References Cited

U.S. PATENT DOCUMENTS

| | | | | |
|---|---|---|---|---|
| 2,982,124 | A * | 5/1961 | Knobel .................. 73/37.7 |
| 3,610,024 | A * | 10/1971 | Honjo et al. ............ 73/37.5 |
| 3,818,327 | A * | 6/1974 | Alexander .............. 324/231 |
| 4,292,838 | A * | 10/1981 | Larsen ................... 73/37.7 |
| 4,450,404 | A * | 5/1984 | Williams et al. ........ 324/226 |
| 4,849,694 | A * | 7/1989 | Coates ................... 324/230 |
| 4,929,895 | A * | 5/1990 | Typpo .................... 324/231 |
| 5,001,356 | A * | 3/1991 | Ichikawa ............. 250/559.27 |
| 5,485,082 | A * | 1/1996 | Wisspeintner et al. ... 324/202 |
| 5,609,511 | A * | 3/1997 | Moriyama et al. ......... 451/5 |
| 5,742,167 | A * | 4/1998 | Haynes .................. 324/671 |
| 5,824,901 | A * | 10/1998 | van Seeters ........... 73/514.32 |
| 5,865,059 | A * | 2/1999 | Alessandro .............. 73/159 |
| 6,318,153 | B1 | 11/2001 | Dumberger et al. |
| 6,388,452 | B1 * | 5/2002 | Picciotto ................ 324/663 |
| 6,588,118 | B2 * | 7/2003 | Hellstrom .............. 33/501.02 |
| 2004/0070393 | A1* | 4/2004 | Sarfaty et al. .......... 324/230 |
| 2005/0157314 | A1* | 7/2005 | Typpoe et al. ........... 356/630 |
| 2007/0084837 | A1* | 4/2007 | Kosmowski ......... 219/121.68 |

FOREIGN PATENT DOCUMENTS

| | | |
|---|---|---|
| DE | 36 12914 | 10/1987 |
| DE | 195 11 939 | 10/1996 |
| DE | 199 59 570 | 5/2001 |
| DE | 102 42 175 | 3/2004 |
| EP | 0 801 290 | 10/1997 |
| EP | 0 591 239 | 1/1998 |
| EP | 1 191 305 | 3/2002 |
| GB | 1 436 698 | 5/1976 |

* cited by examiner

*Primary Examiner*—Hoa Q. Pham
(74) *Attorney, Agent, or Firm*—Richard M. Goldberg

(57) ABSTRACT

Method for measuring thicknesses of a film, a foil or a material layer with a measuring head which is spaced away from the film and with which a capacitive thickness measurement is performed, in which an optical distance measurement is performed with a distance measuring device and a distance determined by the optical distance measurement is used in determining the film thickness in the capacitive thickness measurement.

16 Claims, 3 Drawing Sheets

APPARATUS AND METHOD FOR CAPACITIVE MEASUREMENT OF MATERIALS

BACKGROUND OF THE INVENTION

The invention relates to an apparatus and a method for measuring the thickness of a foil, a film or a material layer by means of a measuring head which is spaced away from the film and with which a capacitive thickness measurement is performed.

Methods of measuring film thickness are used in particular in the production of plastic films, so that the film thickness and, as the case may be, the evenness of the film thickness over the width of the film may be monitored during the manufacturing process and may be regulated, if necessary. For example, in a blow film apparatus, the measuring head is arranged at the film bubble, which is inflated by internal blow air and is drawn-off upwardly, in such a manner that it may revolve around the film bubble and thus can measure the film thickness on the entire periphery of the film bubble during one revolution. As it would be difficult, in particular in case of blow films, to arrange components of the measuring head on both sides of the film or to provide a metallic support or backup roller on the back side of the film, the measuring head should be constructed such that the measurement can be performed from one side of the blow film.

Measurement methods are known, which do not fulfill this feature. Thus, DE 199 59 570 A1 discloses a sensor for contactless measurement of materials, wherein the object to be measured is guided on a support, and a ball guided in a cage rolls over the object with a little application force. A height displacement of the ball within the cage is measured by laser triangulation, while, simultaneously, the distance of the cage from the metallic support is measured by means of an eddy current sensor. Adding the measured results gives the thickness of the object. Disadvantageous is on the one hand the necessity of a metallic support and, on the other hand, the contact of the ball with the object to be measured.

Further, the company Micro Epsilon commercializes measuring devices in which, also, an eddy current measurement is performed for determining the spacing of a sensor from a metallic support roller, on which the film is disposed, while an additional measurement of the spacing between the film surface and the sensor is performed by means of a laser micrometer, or a capacitive measurement of the film thickness is performed, depending on the type of the device. In the capacitive measurement, which is highly sensitive to distance variations, the distance value obtained by the eddy current measurement is used for compensating distance fluctuations. Disadvantageous is in any case the necessity of a metallic support roller. In another known method for measuring thicknesses of profiled materials, respective laser-optical triangulation sensors for detecting the surface of the material are disposed on both sides of a measuring gap. The thickness of the material passed through the measuring gap is determined from the measured results, the width of the measuring gap being additionally monitored by means of an eddy current measurement. Here, it is a disadvantage that a triangulation sensor is necessary on both sides of the material.

DE 36 12 914 A1 discloses a method of measuring the thickness of paper, wherein an air cushion provides a constant spacing between a surface of the paper, which is disposed on a support, and a measuring head, while, simultaneously, the spacing between the measuring head and the support is determined by means of an inductive displacement sensor. Again, it is particularly the necessity of a support which is disadvantageous. Moreover, the accuracy of the measurement is limited, due to fluctuations in the thickness of the air cushion.

A capacitive method, wherein a contactless thickness measurement is performed from one side of a film while the measuring head is held spaced away from the film by means of an air cushion, is known from EP 0 591 239 and GB 1 436 698. Therein, an air cushion is created between the measuring head and the film, for example by supplying gas under pressure, and the measuring head is held in an approximately constant distance from the surface by the air cushion. This prevents a contact between the film and the measuring head.

A single-sided capacitive thickness measurement utilizes the effect, that the electrically non-conductive film acts as a dielectric in a fringe field of a plate capacitor. Thus, a change in film thickness corresponds to a change in capacity of the capacitor. A problem is that a change in the distance between the film and the capacitive measurement device tampers the capacitance measurement and, consequently, the thickness measurement, wherein the measurement error may be of the same order of magnitude as the measured film thickness. This disturbing influence of distance changes becomes larger with increasing distance between the measuring head and the film, since the field strength of the capacitor decreases strongly at larger distances. In the production of blow films, however, the movements of the film inevitably lead to fluctuations in the distance between the measuring head and the film. These fluctuations disturb the capacitive measurement and lead to erroneous measurement results DE 195 11 939 discloses a sensor head, which is supported without friction in a mount of a sensor. Therein, gas is supplied via a gas supply opening at the measuring head, and the gas will flow away laterally between the measuring head and the film, so that an equilibrium between the repelling action of the gas pressure and the suction action of the flowing gas is established. The measuring head is thereby held at an essentially constant distance from the film. In addition to this fine-adjustment of the distance, an automatic coarse-adjustment of the position of the measuring head is proposed, by means of a distance sensor which may be an optical, ultrasonic or also a capacitive sensor, for example. This measuring head has the drawback that, on the one hand, it is required that the capacitive thickness measurement shall be as insensitive as possible to the distance within the available distance range. On the other hand, the frictionless suspension of the measuring head is very complex. Moreover, the sensor head will not always follow-up to the film with sufficiently quick response, because of its mass of inertia, so that the admissible distance range may be left.

EP 0 801 290 discloses a method, wherein an air cushion is also created between the measuring head and the film. An active feedback control of the distance between the measuring head and the film is performed indirectly by measuring and controlling the pressure within the air cushion between the measuring head and the film. The pressure is controlled, for being adjusted to a reference pressure, by shifting the position of the measuring head by means of a linear motor. In addition to or in place of the pressure control, a correction of the distance-dependent results of the capacitive thickness measurement shall be performed on the basis of the distance data that have been obtained by the pressure measurements. To this end, a simple functional relation between the magnitude of the measurement error and the distance between the measuring head and the film is assumed. According to this, the thickness d(x) measured at the distance x is related to the thickness $d_0$ measured at the distance x=0 by $d(x) = d_0/(1+x)$. A drawback is high effort for the pressure measurement, which, moreover, permits to derive the distance between the measuring head and the film only indirectly and with a low reliability and depends on the advance speed, the curvature and the surface properties of the film. The position adjustment of the measuring head influences the pressure in the air cushion only indirectly and with time delay and, moreover, the mass of inertia of the measuring head makes it difficult to adjust the position of the measuring head quickly and exactly. Under certain operating conditions of a blow film apparatus, it may therefore not be possible to stably maintain the target reference pressure.

SUMMARY OF THE INVENTION

It is an object of the invention to provide a method and an apparatus which permit a more exact and error-free contactless thickness measurement.

In order to achieve this object, in a method of the type indicated in the opening paragraph, an optical distance measurement is performed by means of a distance measuring device, and a distance that has been obtained by the optical distance measurement is utilized in the capacitive thickness measurement. In the optical distance measurement, the distance between the film and the measuring head is measured directly.

Preferably, the distance that has been determined by optical distance measurement is accounted for in the measurement of the film thickness in consideration of a distance dependency of the thickness measurements that is known beforehand. For example, for a given measuring head, the distance dependency of the thickness measurements can be measured after the measuring head has been manufactured. In this way, a highly exact thickness measurement can be performed, because fluctuations in the distance between the measuring head and the film are to certain extent non-critical. Moreover, the optical distance measurement is a true, direct measurement of the distance and is thus independent of the speed of advance of the film, for example. Moreover, the method according to the invention permits a simple construction of the measuring head and its suspension or guide system.

In order to be able to assume that the distance is approximately constant over the measurement area of the capacitive thickness measurement, the capacitive thickness measuring device is preferably constructed such that the capacitive thickness measurement takes place on a measurement area that is as small as possible. Then, the optical distance measurement is preferably performed within this measurement area. Alternatively, in case of a larger measurement area, several optical distance measurements may be made at different positions, for example by means of a multiplexer.

Useful details of the invention are indicated in the dependent claims.

Preferably, the measuring head has a supply opening for gas or air for creating a gas or air cushion between the measuring head and the film. Such an air cushion results in a certain self-regulation of the distance between the measuring head and the film.

Preferably, at least one sensor optical system of the distance measuring device is integrated into the measuring head. When the distance measuring device is arranged close to the thickness measuring device, this has the advantage that the distance is measured directly in the vicinity of the location of the thickness measurement and thus contributes to an increased accuracy of the thickness measurement.

In a particularly preferred embodiment, the optical distance measurement is a chromatic distance measurement. This requires only a single detection aperture at the measuring head. The chromatic distance measurement is performed for example with white light and an optical system which focuses the different wavelengths of the light at different distances from the detection aperture. It is a particular advantage of the chromatic distance measurement that it is robust against bulging or curvature of the film surface and permits for example an angular displacement of up to $\pm 30_t$. In addition, it is insensitive against rills or streaks on the film, roughness of the film, and the speed of advance of the film.

The measuring head preferably provides a detection space for the optical distance measuring device, which detection space is situated on the rear side of the detection aperture and includes a device for supplying gas or air for scavenging the detection aperture. As a result, the detection space of the optical distance measuring device, which is open towards the detection aperture, may for example be held at a slightly increased pressure in relation to the area in front of the measuring head, so that no contaminants will enter through the detection aperture.

BRIEF DESCRIPTION OF THE DRAWING

A preferred embodiment will now described in conjunction with the drawings, wherein.

DETAILED DESCRIPTION

Figure 1:
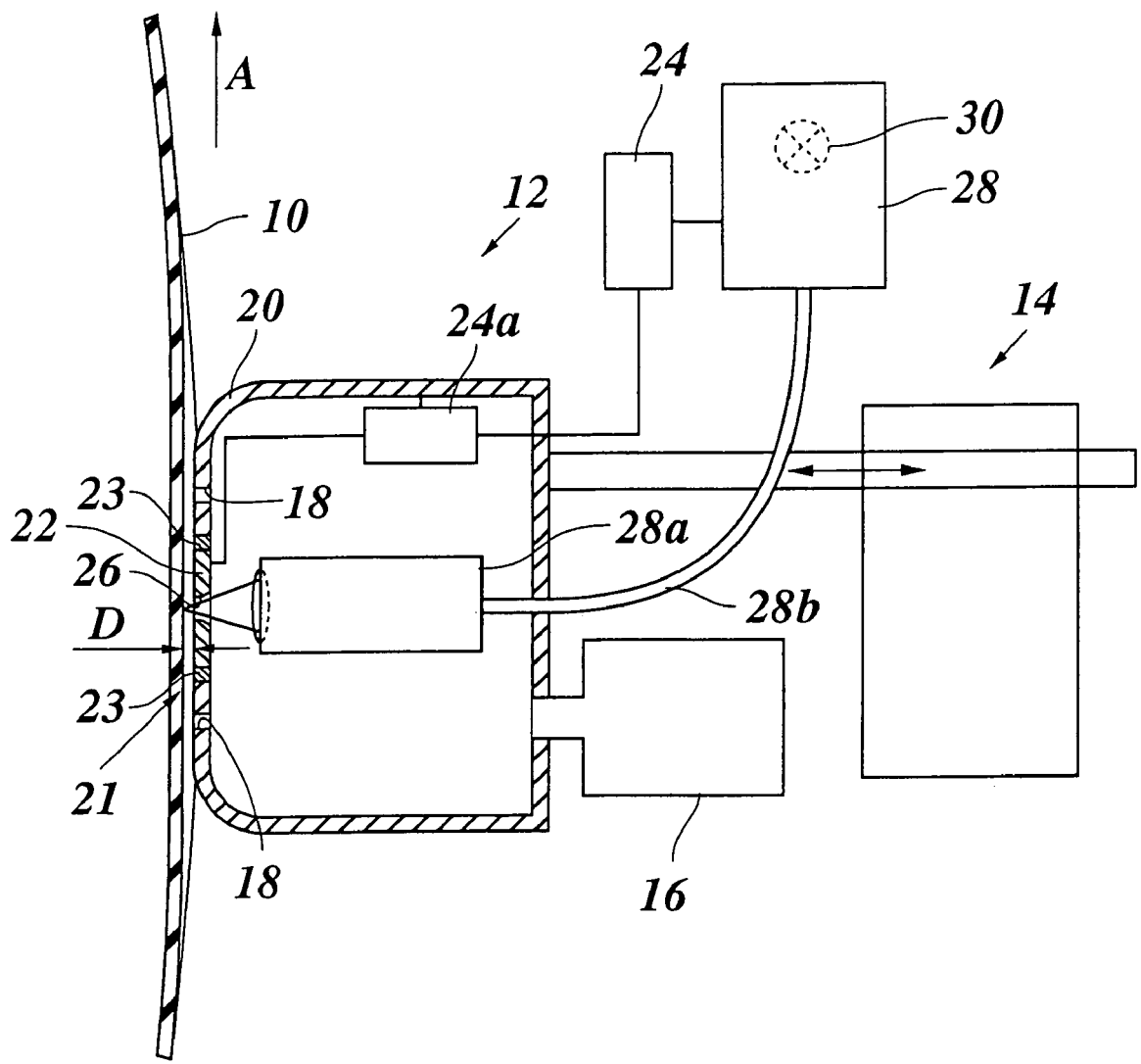
FIG. 1 is a schematic view of a measuring head at a film bubble.

FIG. 1 shows, in a vertical section, a portion of a tube-like film 10 which is extruded from an extrusion die, is inflated by internal air to form a film bubble and is drawn-off in a direction indicated by an arrow A. For measuring the thickness of the film 10, a measuring head 12 is provided, which is rounded at its front side facing the film 10, in order to prevent the film 10 from being damaged.

During the measurement, the measuring head 12 is held in front of the film 10 by means of a positioning device 14, and a compressed air generator 16 generates compressed air which exits via supply openings 18 at the front side of the hollow measuring head 12 and causes an air cushion to build up between the measuring head 12 and the film 10. By means of the positioning device 14, the measuring head 12 is held in a position in which it slightly deflects the film 10 with the air cushion. Then, the internal pressure of the film bubble assures that the film 10 passes essentially straight along the front side of the measuring head 12, so that the thickness of the air cushion and hence the distance D between the front side of the measuring head 12 and the surface of the film 10 will be approximately uniform.

Figure 2:
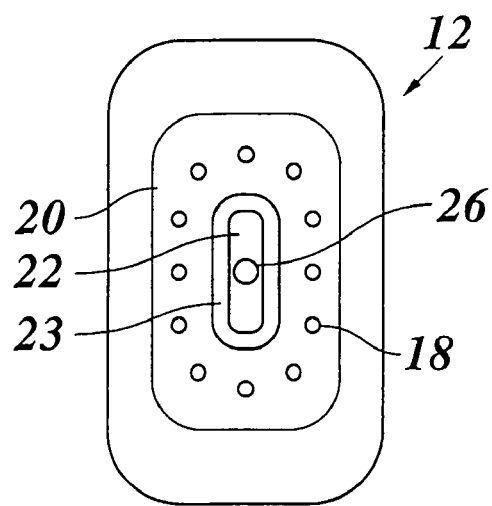
FIG. 2 is a front view of the measuring head.

A casing 20 of the measuring head 12 forms a first electrode of a measuring capacitor 21 and has an aperture formed approximately in the center of the front side of the measuring head 10, where a plate-like second electrode 22 is arranged. The capacitor gap between the electrode 22 and the casing 20 is closed by an insulator 23. FIG. 2 shows the elongated, approximately oval of shape of the electrode 22 surrounded by the insulator 23. The air supply openings 18 are arranged in the casing 20 to form a ring around the insulator 23.

The capacitance of the measuring capacitor 21 is influenced by the dielectric properties of the film 10 arranged in front of the measuring head 12. The measuring capacitor 21 is connected to a measuring unit 24 via measuring electronics 24a and, together with these, forms a capacitive thickness measuring device. The fundamental principle of a capacitive thickness measurement is known and will therefore not be explained in detail. The fringe field of the measuring capacitor 21 penetrates into a region of essentially 1 mm in front of the front side of the measuring head 12.

A detection aperture 26 of a sensor optical system 28a of an optical distance measuring device 28 is arranged centrally of the front face of the measuring head 12 in the center of the electrode 22. The sensor optical system 28a is connected to a glass fiber cable 28b. The diameter of the detection aperture 26 amounts to only 0.5 mm, for example. The optical distance measuring device 28 detects optically the distance D between the measuring head 12 and the film 10 and is connected to the measuring unit 24 of the thickness measuring device for transmitting the detected distance D. The optical distance measurement will be explained below in conjunction with FIG. 3.

The positioning device 14 is controlled, for example, on the basis of the measurement result of the optical distance measuring device 28, so that the measured distance D is feedback controlled to a target value. Alternatively or in addition, an ultrasonic distance sensor, for example, or another control element may be provided for controlling the positioning device 14. It would be conceivable, for example, to control the pressing force, with which the measuring head 12 is pressed against the film 10, in analogy to the method known from EP 1 191 305.

The measuring unit 24 stores data which relate to the distance-dependency of the thickness measurements and which are obtained for example by calibration measurements of the measuring head 12. The data describing the distance dependency may optionally be stored as numerical data or, simplified, as a functional relationship or in the form of parameters of the latter. On the basis of the known distance dependency of the thickness measurements and of the distance D as determined by the optical distance measuring device 28, the capacitive thickness measurement of the film 10 is performed by the thickness measuring device 21, 24 with high accuracy.

Figure 3:
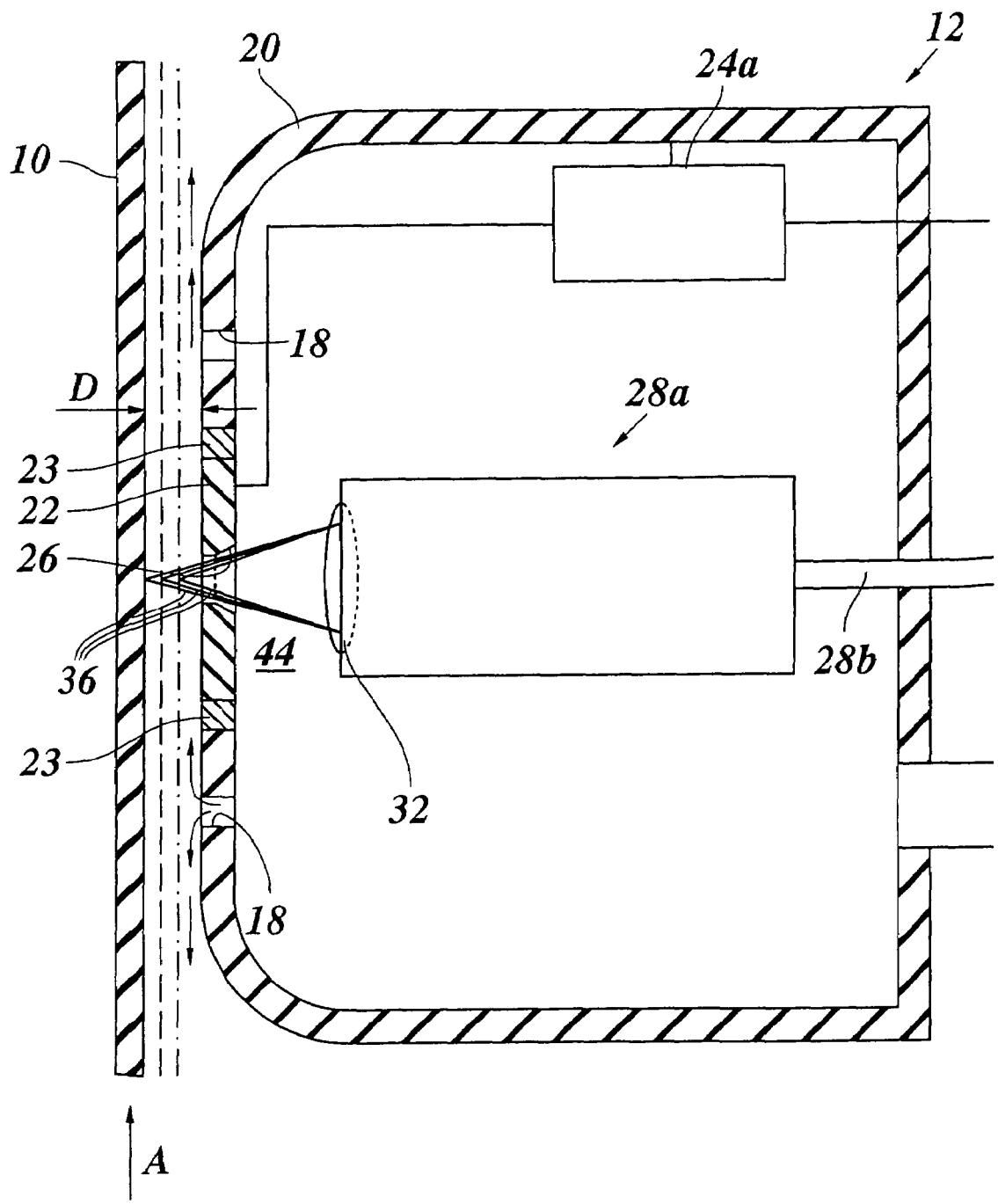
FIG. 3 is a detailed view of the measuring head.

FIG. 3 illustrates schematically the function principle of the distance measuring device 28, which is a chromatic distance measuring device. The principle of a chromatic distance measurement is known per-se, and a chromatic distance measuring device with a sensor optical system, connected via a glass fiber cable, is commercially available, for example. For instance, a source 30 of white light (FIG. 1) generates light in different parts of the spectrum, which light is focused by lenses or lens systems 32 in different focal points with different focal lengths in front of the optical system 28a, as is symbolized by ray-cones 36 in FIG. 3. On the basis of the wavelengths, which are reflected at the surface of the film 10 with different strength, depending on the distance D between the measuring head 12 and the surface of the film 10, the distance D may be derived with very high accuracy from the spectral intensities detected by the distance measuring device 28. The glass fiber cable 28b has a plurality of thin waveguides, a portion of which is used for guiding the light towards the film, and another portion of which is used for returning the reflected light.

The optical path between the optical system 28a and the detection aperture 26 passes through the detection space 44 formed between the optical system 28a and the detection aperture 26. In order to prevent the detection aperture 26 and the detection space 44 as well as the lens 32 adjacent thereto from being contaminated, the detection space 44 is connected to the compressed air generator 16, so that compressed air will exit also through the detection aperture 26. In this way, an air pressure which is slightly increased relative to the space in front of the measuring head 12 is constantly maintained in the measuring space 44, so that no contaminants will enter through the detection aperture 26.

The measuring head 12 according to the invention permits to determine film thicknesses with very high accuracy, with a typical distance D being 100 µm±50 µm, for example. Depending on the construction of the optical distance measuring device 28, positional changes of the film 10 may be measured exactly over a range of, for example, up to 300 µm. Thanks to this relatively large detection range of the optical distance measuring device 28, the self-regulation of the distance D between the film 10 and the measuring head 12, as achieved by the air cushion, is sufficient for permitting always a reliable detection of the thickness of the film 10, even when the film sways or flutters. In this context, the close spatial relationship between the measuring capacitor 21 and the detection aperture 26 is particularly advantageous.

In addition, the chromatic distance measurement, in comparison to a distance measurement by triangulation or interferometry, is particularly well suited for being integrated into the measuring head 12 and is also insensitive, in particular, against an angular displacement of the film surface.

The flow of air exiting from the supply opening 18 and in the air cushion is symbolized by arrows in FIG. 3.

Figure 4:
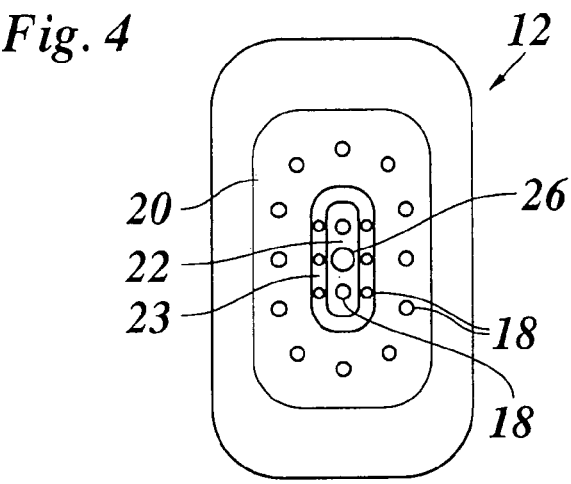
FIGS. 4 and 5 are front views of two modified embodiments of the measuring head.

FIG. 4 shows a modified version of the measuring head 12 of FIG. 2, wherein additional supply openings for compressed air are provided in the second electrode 22 and in the insulator 23. Optionally, the supply openings 18 may as well be arranged only in the insulator 23 or in the central electrode 22. Arbitrary combinations in the arrangement of the supply opening 18 are conceivable.

Figure 5:
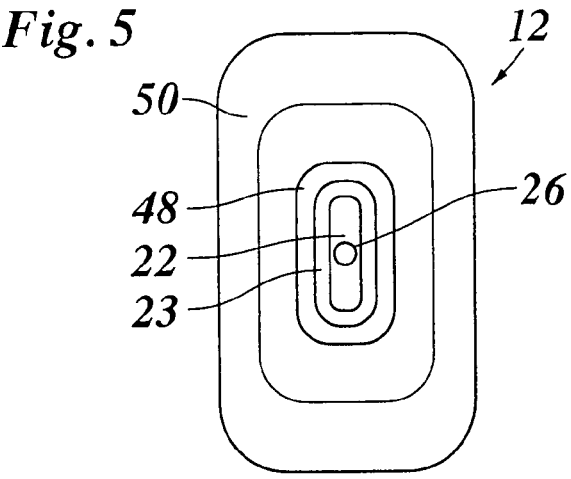

FIG. 5 shows an embodiment, in which the first electrode of the measuring capacitor 21 is formed by an annular electrode 48 which is embedded in an insulating casing 50 of the measuring head 12. The casing 50, at the front side thereof, is made of a microporous material, e.g. ceramic. Through the pores of this material, which serve as air supply openings, the compressed air is discharged to the front side of the measuring head 12 in a particularly uniform way. The air cushion and hence the distance D are therefore particularly homogeneous.

Figure 6:
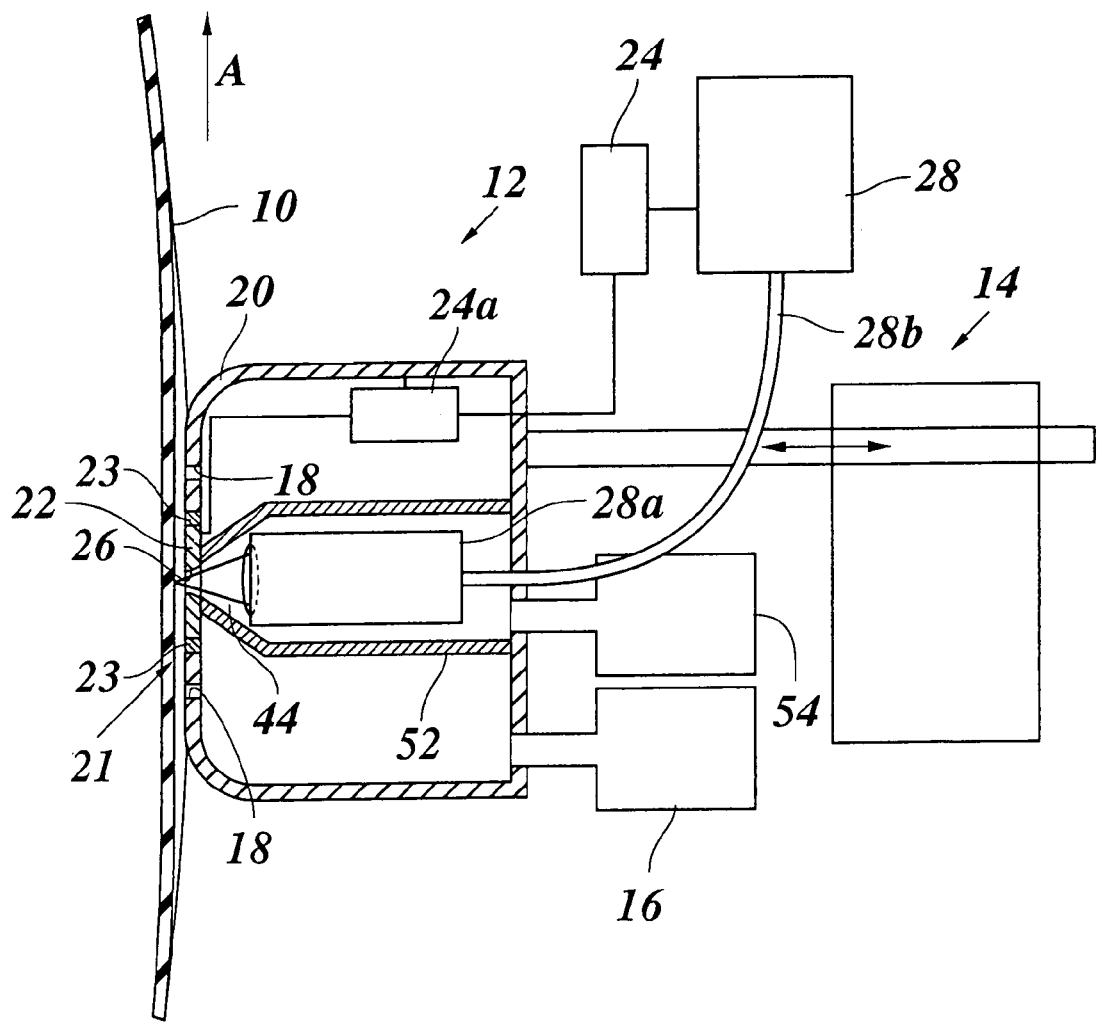
FIG. 6 is a schematic view of a modified embodiment of the measuring head.

FIG. 6 shows another embodiment of the measuring head 12, in which the detection space 44 within a measuring head 12 is provided with a separate enclosure 52. The enclosure includes for example the sensor optical system 28a. The interior of the enclosure 52 is connected to a second compressed air generator 54. Thus, the pressure in the detection space 44 can be adjusted separately. For example, the pressure in the detection space 44 may be reduced in comparison to the pressure outside of the enclosure 52, so that, at the location of the optical measurement, in front of the detection aperture 26, the film 10 will not be blown away towards the measuring head to a too large extent by the compressed air exiting from the detection aperture 26. Moreover, particularly clean compressed air may be supplied into the detection space 44.

In place of a separate enclosure 52, it is also possible, for example, to insert a thin glass plate into the detection aperture 26, in order to avoid contamination. This has been indicated by a broken line in FIG. 3. Such a glass plate is accessible from the outside for being cleaned, if necessary.

The arrangements of the electrodes of the measuring capacitor 21 as described in the embodiment examples represent only possible examples, in which the electrodes are opposed to one another across an approximately oval annular gap. However, the electrodes may also be opposed to one another, for example, along a zig-zag capacitor gap, so that the effective length of the capacitor gap will be increased further, within a limited area of the measuring head 12. As an alternative, the shape of the capacitor 21 may also be circular. Moreover, a third, grounded electrode may be provided, as in GB 1 436 698, for example, in a capacitor arrangement with protective ring.

In addition to the described supply openings 18 for the compressed air, the measuring head 12 may also have additional supply openings in the outer regions of its casing, influencing the way how the film 10 matches to the shape of the measuring head 12. Instead of a hollow interior, the measuring head 12 may also have an integrated compressed air manifold.

Optionally, in case of transparent or optically translucent films, the optical distance measuring device 28 may be operated in a supplementary measuring mode in which two reflection peaks are evaluated, one from the front side and one from the back side of the film 10. In this way, supplementarily, a purely optical thickness measurement of the film may be achieved, with a precision in the nm range.

In a specific mode of operation of the measuring unit 24 and the optical distance measuring device 28, the data stored in the measuring unit 24, which describe the distance dependency of the capacitive thickness measurements, may be corrected and adjusted on the basis of repeated optical thickness measurements. The optical measurement can be performed very quickly, for example with a frequency of 1000 measured values per second. The correction or adjustment of the data describing the distance dependency of the capacitive thickness measurement is particularly useful, for example, when the measuring head 12 or the supply openings 18 gradually become stained, and the aerodynamics of the air flow change during operation of the measuring head.

What is claimed is:

1. Method for measuring thicknesses of a film, a foil or a material layer with a measuring head which is spaced away from the film, comprising the steps of:
   optically measuring a distance of the film relative to the measuring head, with a distance measuring device,
   measuring a capacitance by the measuring head as a function of film thickness, and
   performing a capacitive thickness measurement of the film in a thickness measuring device to determine the film thickness, on the basis of:
   a known distance dependency of thickness measurements relative to capacitance,
   the measured capacitance, and
   the distance measurement determined in the optical measuring step.

2. Method according to claim 1, further comprising the step of arranging the measuring head on one side of the film to be measured.

3. Method according to claim 1, further comprising the step of creating a gas or air cushion in a space intervening between the measuring head and the film.

4. Method according to claim 1, wherein the step of optically measuring the distance is performed through the measuring head.

5. Method according to claim 1, wherein the optical distance measurement is a chromatic distance measurement.

6. Method according to claim 1, wherein the step of optically measuring a distance includes the steps of:
   performing an optical thickness measurement of the film,
   correcting data relating to a distance dependency of the capacitive thickness measurement on the basis of values obtained by the optical thickness measurement, and
   utilizing said data relating to the distance dependency of the capacitive thickness measurement in the capacitive measurement of the film thickness.

7. Method according to claim 1, wherein the step of performing a capacitive thickness measurement includes the step of transmitting the distance measurement from the optical measuring step to a measuring unit of a thickness measuring device which performs the step of capacitive thickness measurement.

8. Method according to claim 1, wherein data relating to the known distance dependency of thickness measurements relative to capacitance, are stored in the thickness measuring device.

9. Apparatus for measuring thicknesses of a film, a foil or a material layer, comprising:
   an optical distance measuring device for measuring a distance between the measuring head and the film,
   a measuring head which measures a capacitance as a function of film thickness, and
   a capacitive thickness measuring device for performing a capacitive thickness measurement of the film to determine the film thickness, on the basis of:
   a known distance dependency of thickness measurements relative to capacitance,
   the measured capacitance, and
   the distance measurement determined by the optical distance measurement device.

10. Apparatus according claim 9, wherein the measuring head has at least one supply opening for gas or air for creating a gas or air cushion between the measuring head and the film.

11. Apparatus according to claim 9, wherein the distance measuring device includes at least one sensor optical system integrated in the measuring head.

12. Apparatus according to claim 9, wherein the optical distance measuring device is a chromatic distance measuring device.

13. Apparatus according to claim 9, wherein the measuring head has a detection aperture and a detection space of the optical distance measuring device arranged behind said detection aperture, said detection space having a device for supplying gas or air for scavenging the detection aperture.

14. Apparatus according to claim 9, wherein
   the optical distance measuring device is adapted to operate as an optical thickness measuring device,
   the capacitive thickness measuring device stores data relating to a distance dependency of the capacitive thickness measurement,
   the capacitive thickness measuring device is adapted to correct the data relating to the distance dependency of the capacitive thickness measurement on the basis of thicknesses as determined by the optical distance measuring device operated as an optical thickness measuring device, and the capacitive thickness measuring device is adapted to determine the film thickness in accordance with said data relating to the distance dependency of the capacitive thickness measurement.

15. Apparatus according to claim 9, wherein the capacitive thickness measuring device includes a measuring unit connected with the optical distance measuring device and which is supplied with the distance measurement from the optical distance measuring device.

16. Apparatus according to claim 9, wherein the thickness measuring device stores data relating to the known distance dependency of thickness measurements relative to capacitance.

* * * * *